United States Patent [19]

McCance

[11] Patent Number: 5,365,725
[45] Date of Patent: Nov. 22, 1994

[54] COMBINATION CHIPPER AND GRASS CUTTING BLADE ASSEMBLY FOR RIDING TYPE LAWN MOWERS AND THE LIKE

[76] Inventor: John D. McCance, 243 Spruce Ave., Byesville, Ohio 43723

[21] Appl. No.: 149,275

[22] Filed: Nov. 9, 1993

[51] Int. Cl.$^5$ .............................................. A01D 34/03
[52] U.S. Cl. ................................... 56/16.9; 56/17.5; 56/255; 56/295
[58] Field of Search ................. 56/13.7, 16.9, 17.5, 56/255, 295

[56] References Cited
U.S. PATENT DOCUMENTS

| | | | |
|---|---|---|---|
| 4,057,952 | 11/1977 | Brokaw | 56/16.9 |
| 4,083,166 | 4/1978 | Haas | 56/13.7 |
| 4,796,416 | 1/1989 | Bendig et al. | 56/16.9 |

Primary Examiner—Ramon S. Britts
Assistant Examiner—Pamela A. O'Connor

[57] ABSTRACT

A combination blade assembly is designed for use with a riding type lawn mower and the like. The combination blade assembly modifies the riding type lawn mower into a mulcher and chipper without prohibiting the lawn mower from being used for cutting grass. The combination blade assembly is permanently installed on the riding type lawn mower which eliminates the need for additional equipment. Due to the nature of the riding type lawn mower, the combination blade assembly creates a very mobile mulcher and chipper.

2 Claims, 4 Drawing Sheets

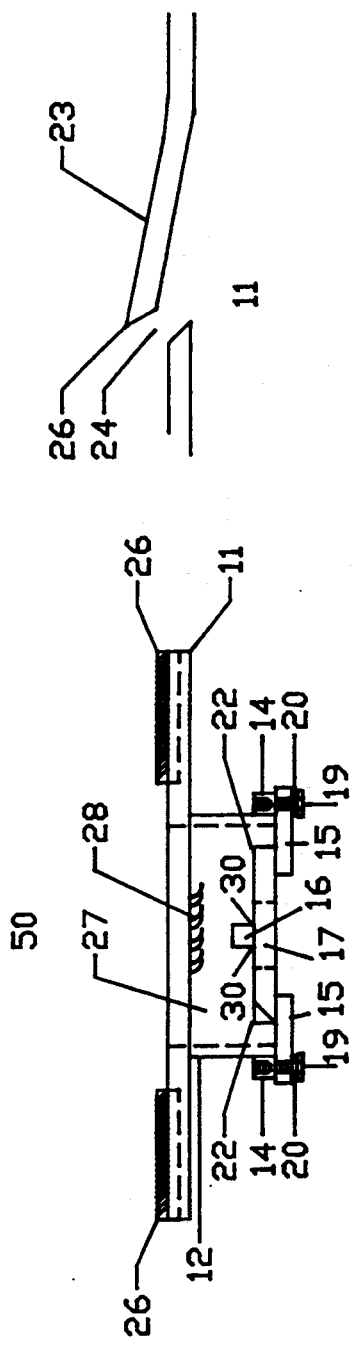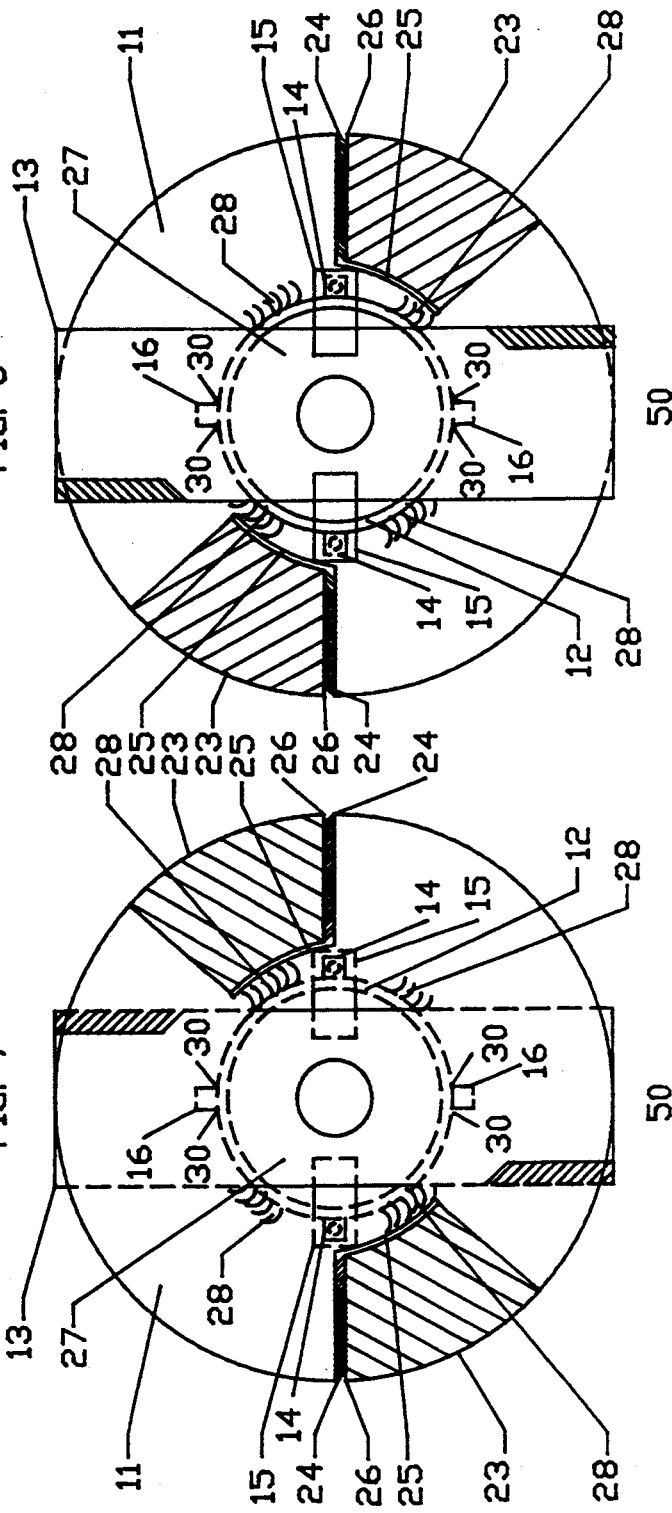

COMBINATION CHIPPER AND GRASS CUTTING BLADE ASSEMBLY FOR RIDING TYPE LAWN MOWERS AND THE LIKE

BACKGROUND OF THE INVENTION

1. The Field of Invention

The present invention relates generally to a combination blade assembly that is attached to the blade shaft of a riding type power lawn mower to modify the mower for mulching and chipping. More specifically, the present invention relates to a combination blade assembly which modifies the riding type power lawn mower to be used for mulching and chipping of branches, brush and tough organic materials in addition to the grass cutting capabilities of the mower, without repeated conversion of the mower after the initial installation of the combination blade assembly on the mower.

2. History of Prior Art

The present prior art provides devices designed primarily for relatively lightweight use in a home garden of soft refuse, yet at the same time provides an efficient shredding and mulching machine enabling such refuse to be chopped finely enough to be incorporated back into the garden if desired, and is also readily converted for use as a lawn mower when desired.

It is often desirable that a riding type power lawn mower is capable of not only cutting grass, leaves and lightweight organic matter, but also possess mulching and chipping capabilities for heavy-weight branches, brush and tough organic materials.

Patents reviewed have disclosed several devices for mulching and chipping organic matter. Many such devices are free standing mulchers and chippers, while other devices are designed to be used with or to modify rotary type power lawn mowers.

The Bendig U.S. Pat. No. 4,796,416, shows a mulching attachment having an upper blade with a spacer coupled to a lower blade and base plate. This blade assembly is used with a rotary type power lawn mower for mulching light-weight organic matter. However, the Bendig patent requires extensive disassemblage of the mower when it is desirable to attach the blade assembly for the conversion of the mower to a mulcher. This conversion prohibits the mower to be used consecutively for cutting grass. Additionally, the Bendig patent requires partial removal of the blade assembly from the mower when it is desirable to use the mower for cutting grass. The required conversion of the mower to a mulcher and back to a mower is time consuming and too laborious for the operator.

The Leuz U.S. Pat. No. 4,901,509, shows a funnel-shaped chute attachment for a rotary type power lawn mower. The device converts the mower to a garden mulcher. This conversion does not allow the mower to be used consecutively for cutting grass. The funnel-shaped attachment must first be removed from the mower, and a coverplate placed over the opening in the mower deck and further disassembling of the mower blade and reassembling of the blade when it is desirable to use the mower for cutting grass. Additionally the Leuz patent was designed specifically for modifying a rotary type power lawn mower to a mulcher of lightweight garden materials.

The Brokaw U.S. Pat. No. 4,057,952, shows a rotary type power lawn mower with chipping and mulching capabilities due to a set of three blades attached to a vertical drive shaft. The three blades include a top chopping blade, a middle shredder blade, and bottom mower blade. The chipping blade is described as being much heavier than the mower blade and acts as a fly wheel to provide increased cutting energy as compared to the horse power of the mower. However, the Brokaw patent assemblage involves a number of parts making the adaption cost prohibitive and too difficult for the average mower owner to assemble. A bottom plate is secured to the mower while being used as a mulcher, this bottom plate prohibits the mower from being used consecutively for cutting grass. The Brokaw patent is also susceptible for organic materials to become lodged in the chopping assembly of the feed roller, as well as the chopping blades. Additionally, due to the complex design, the blade assembly is not suitable for utilization with a riding type power lawn mower.

The Haas U.S. Pat. No. 4,083,166, shows a mulcher attachment comprised of a lightweight circular disc blade with a plurality of openings and blade portions for use with a rotary type power lawn mower that shreds and mulches the lightweight organic materials produced during operation of the mower. However, due to the upward suction of organic materials through the openings of the circular disc blade, the Haas patent is not capable of mulching or shredding large, heavy-weight materials. Whatever the precise merits, features and advantages of the above cited references, none of them achieves or fulfils the purposes of a combination blade assembly as accomplished by the present invention.

SUMMARY OF THE INVENTION

Accordingly, it is a principal object of the present invention to provide a combination blade assembly so designed that when permanently installed on a riding type lawn mower, the mower can be used to efficiently mulch and chip large heavy-weight branches, brush and tough organic materials while still maintaining the conventional capability for cutting grass. There is no need of removing the combination blade assembly from the lawn mower in order for the mower to cut grass. This invention eliminates the laborious procedure of attaching accessory type chutes or blades to the mower as prior art has shown to be necessary.

Another object of this invention is to harness greater horse power when using the riding type power lawn mower to cut large branches, brush, and tough organic materials. Riding type lawn mower engines produce more horse power than the rotary power type lawn mower engines are capable of producing. Therefore, as the horse power of the riding type lawn mower increases, the diameter of the branches can increase proportionately.

A further object of this invention is that the chipper blade of the combination blade assembly acts as a fly wheel which increases the cutting energy of the mower.

Another object of this invention is that the need for two pieces of yard equipment has been eliminated with the modification of the riding type lawn mower as a mulcher, chipper and mower. This replaces unnecessary yard equipment such as expensive mulchers and chippers.

A further object of this invention is that it is highly mobile due to the nature of the riding type lawn mower. This eliminates the laborious task of moving cumbersome equipment to the work site.

A further object of this invention is that the skill required to modify the mower for chipping and mulching is minimal, and the combination blade assembly is easily attached to the mower blade shaft without special tools.

Another object of this invention is with the combination blade assembly installed on the riding type lawn mower, the operator, in most situations, is capable of feeding branches and brush into the combination blade assembly without leaving the seat to do so. The lawn mower is driven to the desired location, then with the parking brake engaged, the transmission in the neutral position and the mower blades engaged, and the mower deck lowered in the lowest position, and with the throttle at the maximum R.P.M., the brush and debris are fed through an opening in the top of the mower deck and into the combination blade assembly directly below the deck opening. The debris is chipped and mulched and discharged by the same manner as cut grass is discharged by the mower discharge chute.

The foregoing and other objects, features and advantages of the invention will be apparent from the following more particular description of the preferred embodiment of the invention, as illustrated in the accompanying drawings.

BRIEF DESCRIPTION OF THE DRAWINGS

FIG. 5 is the top plan view of the combination blade assembly.

FIG. 6 is the bottom plan view of the combination blade assembly.

FIG. 7 is the side plan view of the combination blade assembly.

FIG. 8 is the fragmentary section of the cutting edge of the circular disc chipping blade.

DETAILED DESCRIPTION OF THE DRAWINGS

Figure 1:
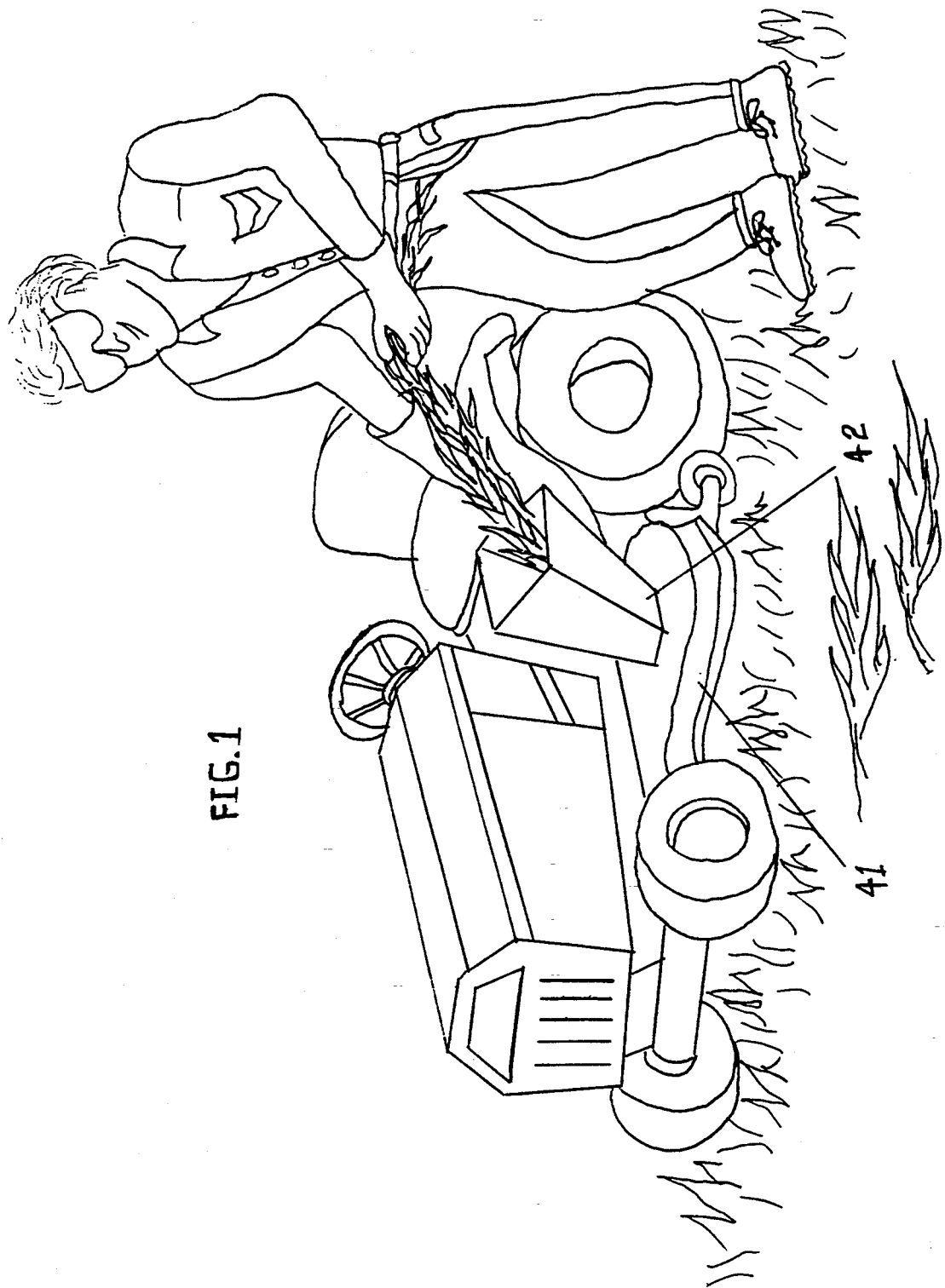
FIG. 1 is an isometric view of the preferred embodiment of the invention in use.

Referring now to FIGS. 1 through 8, as shown in the drawings, the preferred combination blade assembly is designated a numeral 50. According to the present invention, such combination blade assembly 50 is comprised of a circular disc chipping blade 11, a tubular spacer 12, a grass cutting mower blade 13, preferably of substantial thickness of steel plate. Also included in the present invention is a plurality of threaded blocks 14, a plurality of blade locks 15, a plurality of blade stops 16, a plurality of bolts 19, a plurality of lock washers 20 and a nut 44.

Refer to FIG. 1 which illustrates the preferred embodiment of the present invention, shows an individual feeding brush, branches or tough organic material into the entry chute 42 of the mower deck 41 to the combination blade assembly 50, in particular the chipping blade 11, which is directly below the entry chute 42.

Figure 2:
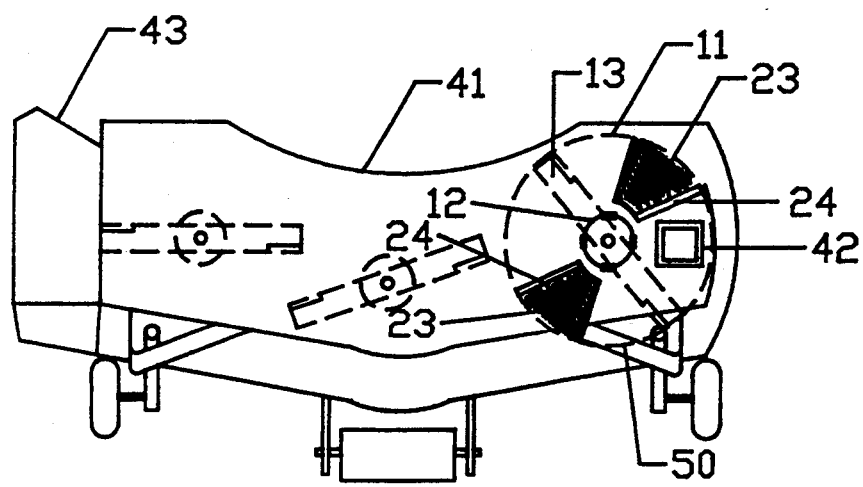
FIG. 2 is the top plan view of the riding type lawn mower deck with the riding mower tractor removed for clarity, thus exposing the opening in the top of the mower deck.

Refer to FIG. 2 which illustrates in accordance with the present invention, an overall drawing of the top view of the riding type lawn mower deck 41 with the tractor removed to show the entry chute 42 in the top of the mower deck 41 and the preferred embodiment of the combination blade assembly 50.

Figure 3:
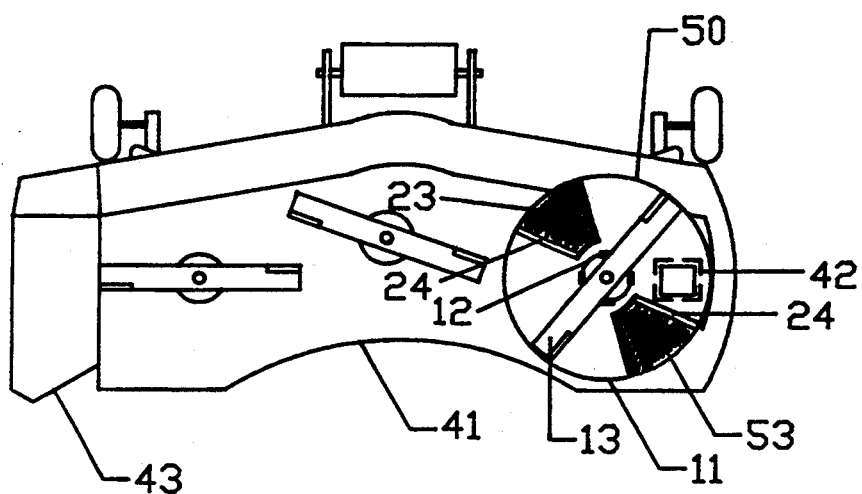
FIG. 3 is the bottom plan view of the riding type lawn mower deck showing the preferred embodiment of the combination blade assembly in position according to the invention, in relation to additional mower blades.

Refer to FIG. 3 which illustrates in accordance with the present invention, an overall drawing of the bottom view of the riding type lawn mower deck 41 with combination blade assembly 50 in the preferred embodiment relative to the other blades of the lawn mower.

Refer to FIG. 5, 6, and 7, which illustrates the circular disc chipping blade 11, the circumference of the circular disc chipping blade 11 is interrupted with a plurality of integrally formed and upward extending blade like portions 23 formed from horizontally cut slots 24, located an equal distance from each, proceeding from the outer circumference of the circular disc chipping blade 11 and extending inwardly toward the center of the circular disc chipping blade 11, then the slots 24 form an arcuate slot 25, in a generally backward cut respectively parallel with the arch of the circumference of the circular disc chipping blade 11, which allows a portion of the circular disc chipping blade 11 to be raised upward, exposing a plurality of cutting edges 26 formed integrally of the circular disc chipping blade 11. The circular disc chipping blade 11 also contains a central opening 27 to accommodate the bearing housing of the mower blade drive shaft 40. Also included in the present invention is a downward extending tubular spacer 12 preferably of substantial thickness of steel plate. The grass cutting mower blade 13 also comprises a central opening 17 to accommodate the mower blade drive shaft 40. Welded to the upper surface of the grass cutting mower blade 13 is a plurality of blade stops 16. The preferred location of the blade stops 16 are spaced at equal distances from the edge of the grass cutting mower blade 13 and the outside of the tubular spacer 12 directly above the spacer notch 22.

Figure 4:
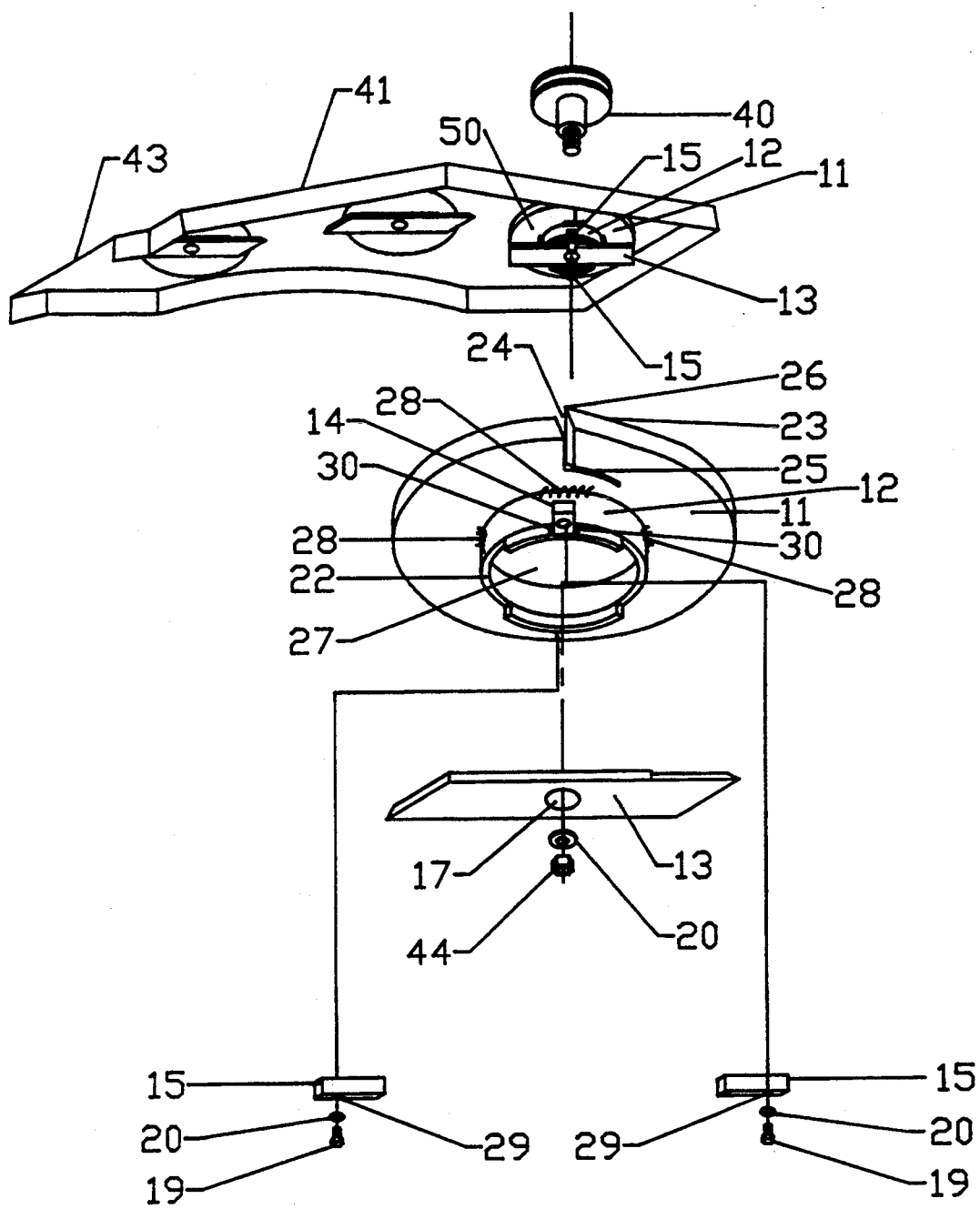
FIG. 4 is an expoded isometric view showing the assembly of this invention in the preferred embodiment as it is to be mounted on the underside of the riding type lawn mower deck.

It is believed that the combination blade assembly 50 could be assembled in the preferred embodiment as shown in FIG. 4, by attaching the tubular spacer 12 directly to the circular disc chipping blade 11 preferably at a plurality of welded points 28, located equally around the uppermost edge of the tubular spacer 12 and on the underneath surface of the circular disc chipping blade 11, where the circular disc chipping blade 11 and the tubular spacer 12, are integrally connected. The spacer notches 22 accommodates the grass cutting mower blade 13 for attachment to the tubular spacer 12. The grass cutting mower blade 13, is secured in the tubular spacer notches 22 with a plurality of blade locks 15 which in turn are secured by placing a bolt 19 through a lock washer 20 and through an opening 29 in the blade lock 15 and finally into the threaded block 14 that has been welded 30 to the outside of the lower edge of the tubular spacer 12, located equally between the spacer notches 22. The combination blade assembly 50 is held on the mower blade drive shaft 40 in the usual threaded arrangement, whereby the chipper blade 11 will be closely spaced near the inner upper surface of the mower deck 41, while the grass cutting mower blade 13 will be situated in its usual position relative to the mower blade drive shaft 40 and secured with a lock washer 20 and a nut 44.

Now referring to FIG. 8 for an exploded view of the upward extending blade like portion 23 of the circular disc chipping blade 11. The surface of the circular disc chipping blade 11 is cut diagonally which exposes a cutting edge 26 and a slot 24. The upwardly extending blade like portion 23 is formed by raising a portion of the circular disc chipping blade 11 thereby forming the cutting edge 26 of the circular disc chipping blade 11.

Each of the two blades has a specific purpose. The circular disc chipping blade 11, uppermost of the two blades and closest to the under surface of the mower deck 41 of the riding power lawn mower, mulches and chips branches, brush, and tough organic material. When such material is placed through the entry chute 42 of the mower deck 41, the rotating circular disc chipping blade 11 acts as a fly wheel, delivering a very high amount of cutting energy as compared to the horsepower of the riding type lawn mower.

The lowermost blade is the grass cutting mower blade 13. The specific purpose of the grass cutting mower blade 13 acts as a traditional grass cutting blade. The material chipped or mulched by the circular disc chipping blade 11, falls downwardly into the grass cutting mower blade 13 where an additional purpose of the grass cutting mower blade 13 is to shred the chipped or mulched material into finer particles and throw the finer particles outwardly by centrifugal force of the mower blade 13 and cast the finer particles into the remaining grass cutting blades of the riding power lawn mower and discharged through the discharge chute 43 of the riding power lawn mower.

The preferred placement of the combination blade assembly 50 is on a riding type lawn mower with clockwise rotating blades and attached to the blade drive shaft 40 furthest from the discharge chute 43 as shown in FIG. 3. The combination blade assembly 50 forces the chipped materials to be cast into the remaining grass cutting blades before being discharged out the discharge chute 43.

The foregoing description of the preferred embodiment of the invention has been presented for the purposes of illustration and description. It will be apparent that modifications or alterations in accordance with the present invention can be made by those skilled in the art without departing from the scope and spirit therefore, and is not to be exhaustive or to limit the invention to the precise form disclosed.

That which is claimed is:

1. A combination blade assembly designed for use with a riding type lawn mower for chipping and mulching branches, brush and tough organic material during the normal operation of said mower, said combination blade assembly comprising a circular disc chipping blade having inner and outer edges, tubular spacer and grass cutting mower blade, formed from steel plate, said circular disc chipping blade having a plurality of integrally formed and upwardly extending blade portions formed from cut slots located an equal distance from each other and being diagonally cut through the said circular disc chipping blade commencing from the outer edge of the said circular disc blade, cutting through the plate horizontally toward the center of the said circular disc chipping blade to an area which terminates before the inner edge of the said circular disc chipping blade and extending inwardly along the circumference of the center of the, the said slots form an arcuate slot, in a generally backward cut respectively parallel with the arc of the said circumference of the said circular disc chipping blade, which allows the said upwardly extending blade portions of the said circular disc chipping blade to be raised upwardly, exposing a plurality of cutting edges formed integrally of the said circular disc chipping blade, a said central opening of the said circular disc chipping blade accommodates the bearing housing of the said mower blade drive shaft, a said tubular spacer is attached directly to the said circular disc chipping blade at a plurality of welded points located equally around the uppermost edge of the said tubular spacer and on the underneath surface of the said circular disc chipping blade where the said circular disc chipping blade and the said tubular spacer are integrally connected, spacer notches accommodate the said grass cutting mower blade for attachment to the said tubular spacer, the said grass cutting mower blade comprises a central opening to accommodate the said mower blade drive shaft; welded to the upper surface of the said grass cutting mower blade is a plurality of blade stops, located at an equal distance from the edge of the said grass cutting mower blade and the outside of the said tubular spacer directly above the said spacer notches, the said grass cutting mower blade is secured in the said spacer notches, with a plurality of blade locks which in turn are secured by placing a bolt through a lock washer and through an opening in the said blade lock and finally into threaded blocks that has been welded to the outside of the lower edge of the said tubular spacer, located equally between the said spacer notches, the said combination blade assembly is held on the said mower blade drive shaft in a threaded arrangement, whereby the said circular disc chipping blade will be closely spaced near the inner upper surface of the said mower deck, while the said grass cutting mower blade will be situated in a position relative to the said mower blade drive shaft and secured with said lock washer and a nut.

2. A combination blade assembly according to claim 1 is designed to be permanently installed on the said riding type lawn mower for mulching and chipping organic material while the said riding type lawn mower maintains the capability for cutting grass.

* * * * *